United States Patent
Kaewell, Jr. et al.

(10) Patent No.: US 7,092,432 B2
(45) Date of Patent: *Aug. 15, 2006

(54) NODE-B/BASE STATION RAKE FINGER POOLING

(75) Inventors: John David Kaewell, Jr., Jamison, PA (US); Timothy Berghius, Exton, PA (US); Jan Meyer, Weilheim (DE); Peter Bohnhoff, Munich (DE); Alexander Reznik, Princeton, NJ (US); Edward Hepler, Malvern, PA (US); Michael Koch, Fort Salonga, NY (US); William C. Hackett, Doylestown, PA (US); David S. Bass, Great Ncek, NY (US); Clyde N. Robbins, Maple Glen, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 27 days.

This patent is subject to a terminal disclaimer.

(21) Appl. No.: 10/838,634

(22) Filed: May 4, 2004

(65) Prior Publication Data
US 2004/0202228 A1    Oct. 14, 2004

Related U.S. Application Data

(63) Continuation of application No. 10/331,085, filed on Dec. 27, 2002, now Pat. No. 6,785,322.

(60) Provisional application No. 60/372,531, filed on Apr. 12, 2002.

(51) Int. Cl.
    *H04B 1/707* (2006.01)
(52) U.S. Cl. ...................... 375/144; 375/148

(58) Field of Classification Search ................ 375/141, 375/144, 145, 148, 149; 370/320, 335, 342, 370/441
See application file for complete search history.

(56) References Cited

U.S. PATENT DOCUMENTS

| | | | |
|---|---|---|---|
| 5,237,586 A | 8/1993 | Bottomley | |
| 5,329,548 A | 7/1994 | Borg | |
| 5,471,509 A | 11/1995 | Wood et al. | |
| 5,490,165 A | 2/1996 | Blakeney, II et al. | |
| 5,894,473 A | 4/1999 | Dent | |
| 5,910,948 A | 6/1999 | Shou et al. | |
| 5,940,438 A * | 8/1999 | Poon et al. | ........ 375/222 |
| 6,141,334 A | 10/2000 | Flanagan et al. | |

(Continued)

FOREIGN PATENT DOCUMENTS

CN    1140365    1/1997

(Continued)

OTHER PUBLICATIONS

Kong et al., "Average SNR of a Generalized Diversity Selection Combining Scheme," IEEE Communications Letters, vol. 3, No. Mar. 1999, pp. 57-59.

*Primary Examiner*—Don N. Vo
(74) *Attorney, Agent, or Firm*—Volpe and Koenig, P.C.

(57) ABSTRACT

A Node-B/base station receiver comprises at least one antenna for receiving signals. Each finger of a pool of reconfigurable Rake fingers recovers a multipath component of a user and is assigned a code of the user, a code phase of the multipath component and an antenna of the at least one antenna. An antenna/Rake finger pool interface provides each finger of the Rake pool an output of the antenna assigned to that Rake finger. A combiner combines the recovered multipath components for a user to produce data of the user.

21 Claims, 6 Drawing Sheets

U.S. PATENT DOCUMENTS

| | | |
|---|---|---|
| 6,163,533 A | 12/2000 | Esmailzadeh et al. |
| 6,324,210 B1 | 11/2001 | Yang et al. |
| 6,333,926 B1 | 12/2001 | Van Heeswyk et al. |
| 6,333,934 B1 | 12/2001 | Miura |
| 6,414,984 B1 | 7/2002 | Ståhle |
| 6,463,048 B1 | 10/2002 | Garyantes |
| 6,487,193 B1 | 11/2002 | Hamada et al. |
| 6,580,749 B1 | 6/2003 | Miura |
| 6,618,434 B1 | 9/2003 | Heidari-Bateni et al. |
| 6,636,557 B1 | 10/2003 | Imaizumi et al. |
| 6,697,417 B1 | 2/2004 | Fernandez-Corbaton et al. |
| 6,714,586 B1 | 3/2004 | Yang et al. |
| 6,728,304 B1 | 4/2004 | Brown et al. |
| 6,748,013 B1 | 6/2004 | Reznik et al. |
| 6,785,322 B1 * | 8/2004 | Kaewell et al. ............ 375/144 |
| 6,834,075 B1 | 12/2004 | Wang |
| 2001/0033614 A1 | 10/2001 | Hudson |
| 2001/0038666 A1 | 11/2001 | Mesecher et al. |
| 2002/0010002 A1 | 1/2002 | Heinla |
| 2002/0036998 A1 | 3/2002 | Lomp |

FOREIGN PATENT DOCUMENTS

| | | |
|---|---|---|
| CN | 1182986 | 5/1998 |
| CN | 1253424 | 5/2000 |
| CN | 1356802 | 7/2002 |
| CN | 1366390 | 8/2002 |
| CN | 1379932 | 11/2002 |
| CN | 1390001 | 1/2003 |
| EP | 1 028 540 | 8/2000 |
| EP | 1 158 688 | 11/2001 |
| EP | 1 220 482 | 7/2002 |
| JP | 12308148 | 11/2000 |
| JP | 2001/16628 | 1/2001 |
| WO | 95/22210 | 8/1995 |
| WO | 96/21976 | 7/1996 |
| WO | 99/30433 | 6/1999 |
| WO | 0103318 | 1/2001 |
| WO | 0113530 | 2/2001 |
| WO | 01/22638 | 3/2001 |

* cited by examiner

NODE-B/BASE STATION RAKE FINGER POOLING

CROSS REFERENCE TO RELATED APPLICATION(S)

This application is a continuation of U.S. patent application Ser. No. 10/331,085, filed Dec. 27, 2002, which claims priority from U.S. Provisional Application No. 60/372,531, filed on Apr. 12, 2002, which are incorporated by reference as if fully set forth.

FIELD OF INVENTION

The invention generally relates to wireless code division multiple access communication systems. In particular, the invention relates to receiving user signals in such systems.

BACKGROUND

Figure 1:
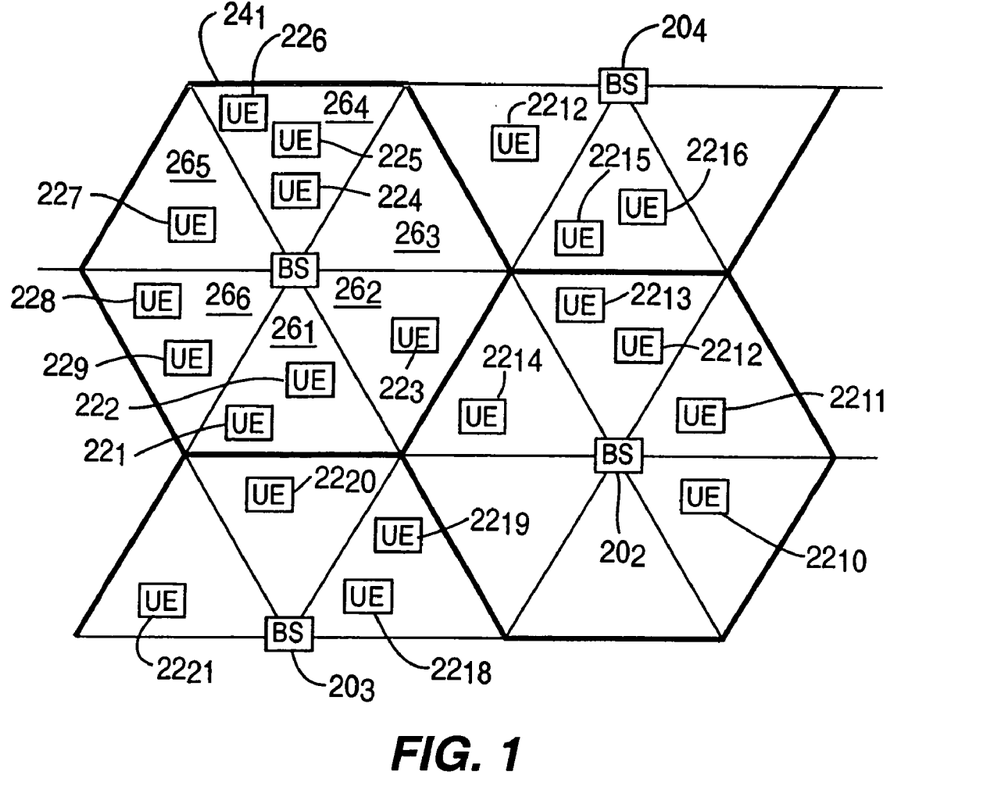
FIG. 1 is an illustration of a simplified wireless code division multiple access communication system.

FIG. 1 is an illustration of a simplified wireless code division multiple access communication system. Each base station $20_1$–$20_4$ (20) communicates with user equipments (UEs) $22_1$–$22_{21}$ (22) in its cell $24_1$–$24_2$. To illustrate as shown in FIG. 1, base station $20_1$ communicates with UEs $22_1$–$22_9$ in its cell 24.

Each cell 24 may also be divided into sectors $26_1$–$26_6$ (26), such as six sectors 26 as shown in FIG. 1. Typically, the base station 20 communicates with each sector 26 using one or multiple antennas assigned to that sector 26. Each UE 22 in a sector 26 communicates with that sector's antennas.

Figure 2A:
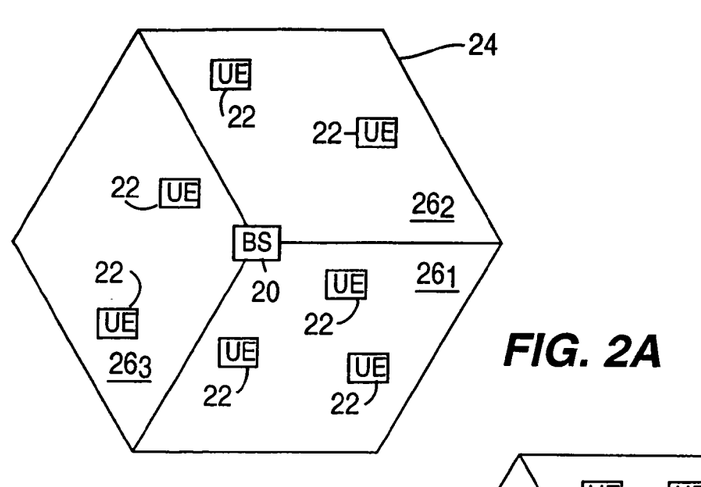
FIG. 2A, 2B and 2C are illustrations of various sector/cell loadings.
Figure 2B:
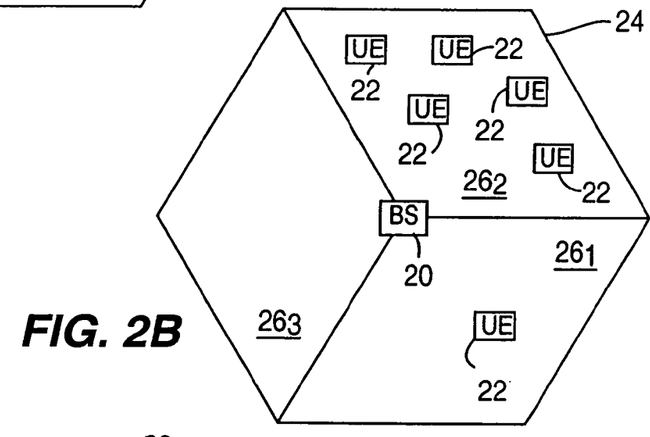
Figure 2C:
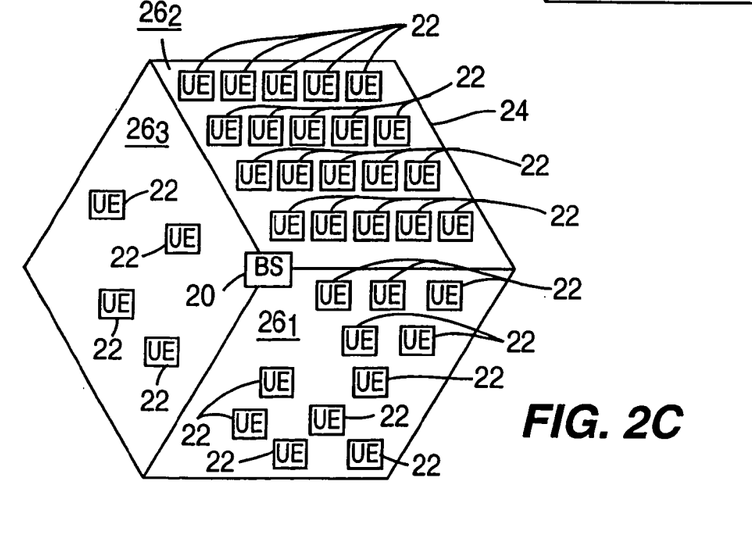

The distribution of UEs 22 in a cell 24 and sector 26 as well as cell and sector loading may vary. FIGS. 2a, 2b and 2c illustrate varieties in a cell and sector loading. FIG. 2a illustrates a lightly loaded three sector cell with even distribution. The UEs 22 in each sector 26 are relatively even. FIG. 2b illustrates a lightly loaded cell 24 with uneven UE distribution. One sector $26_3$ has no users (no UEs) and one sector $26_2$ has many users. FIG. 2C is a heavily loaded cell 24 with uneven distribution. One sector $26_3$ has a few users and other sectors $26_1$ and $26_2$ have a large number of users. The base station/Node-B receiver preferably needs to accommodate all of these various loadings.

Figure 3:
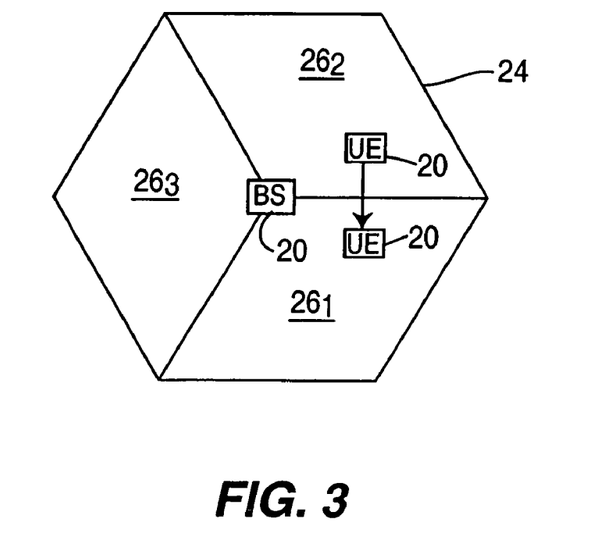
FIG. 3 is an illustration of softer handover.

Furthermore, a UE 22 may move between sectors 26, such as from sector $26_2$ to sector $26_1$, as shown in FIG. 3. One approach to transfer the handing of the UE 22 between the two sectors $26_1$ and $26_2$ is softer handover. In softer handover, during the transition period, the UE 22 communicates with the antennas' of both sectors $26_1$ and $26_2$ simultaneously. To improve signal quality during softer handover, it is desirable for the Node-B/base station receiver to accommodate the combining of the communications received by each sector 26.

Accordingly, it is desirable to have a Node-B/base station receiver capable of handling these varying conditions.

SUMMARY

A Node-B/base station receiver comprises at least one antenna for receiving signals. Each finger of a pool of reconfigurable Rake fingers recovers a multipath component of a user and is assigned a code of the user, a code phase of the multipath component and an antenna of the at least one antenna. An antenna/Rake finger pool interface provides each finger of the Rake pool an output of the antenna assigned to that Rake finger. A combiner combines the recovered multipath components for a user to produce data of the user.

DETAILED DESCRIPTION OF THE PREFERRED EMBODIMENT(S)

Figure 4:
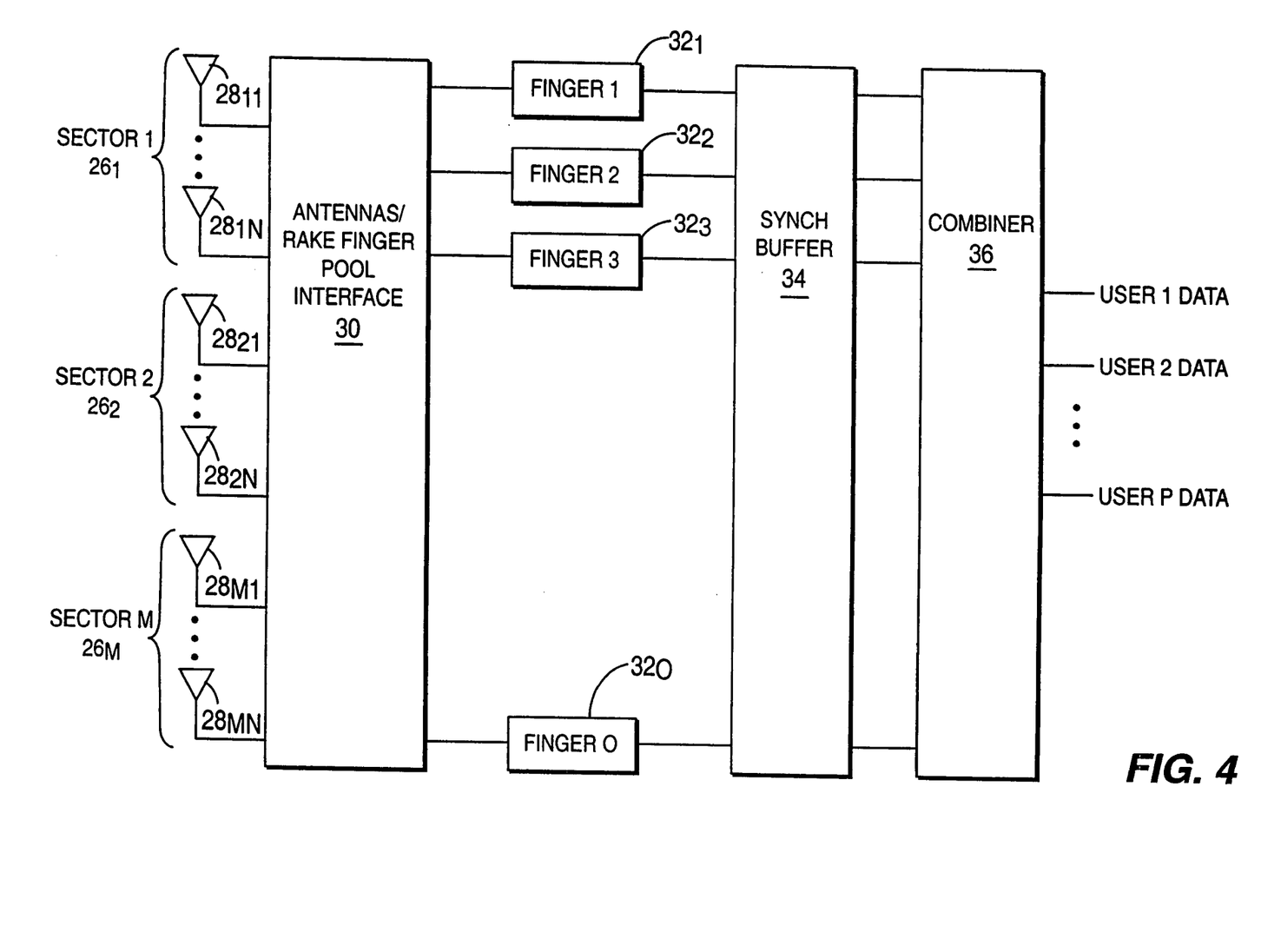
FIG. 4 is a simplified block diagram of a preferred Node-B/base station receiver.

FIG. 4 is a simplified block diagram of a preferred base station/Node-B receiver for a cell 24. The cell 24 is divided into M sectors $26_1$ to $26_m$ (26). Although M can be any value, preferred values for M are six (6), three (3) and one (1). Each sector 26 has N antennas $28_{11}$ to $28_{1N}$ to $28_{M1}$ to $28_{MN}$ (28) for receiving user communications in that sector 26. Although N can be any number and can vary in number from sector to sector, preferred values for N are one (1), two (2), and four (4).

The antennas 28 for all sectors 26 are connected to an antennas/Rake finger pool interface 30. The interface 30 connects the antenna outputs to the Rake finger processors (finger) $32_1$ to $32_O$ (32) of the Rake finger pool. Each Rake finger 32 is assigned a particular user's received multipath component to recover. To recover that component, each Rake finger 32 is assigned an antenna 28, code and code phase associated with the received component. An antenna 28 in a sector 26 that the UE 22 resides is connected to the Rake fingers 32 via the antennas/Rake finger pool interface 30. The code used by the UE 22 is provided to the Rake finger 32 as well as the code phase of the desired multipath components. The Rake finger 32 recovers the multipath component and weights the component prior to being combined with other multipath components of the user.

Figure 5:
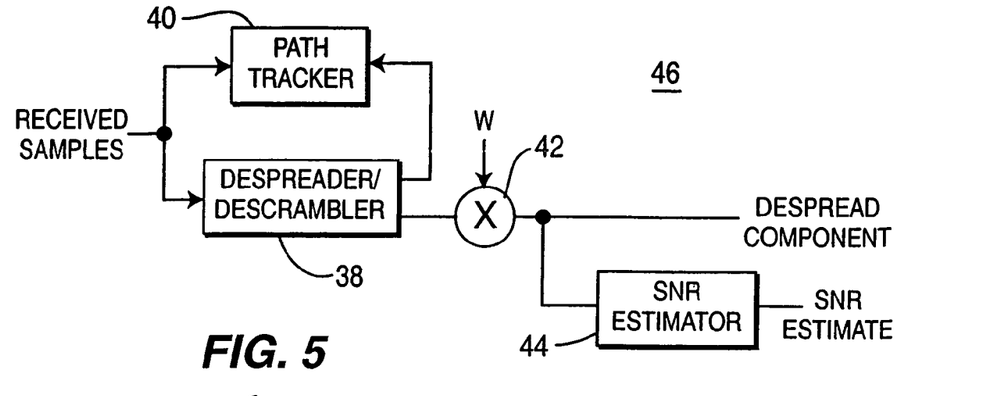
FIG. 5 is an illustration of a preferred Rake finger.

FIG. 5 is an illustration of a preferred Rake finger 46, although other Rake finger implementations may be used. The finger 46 receives samples of a received signal from its antenna 28. A path tracker 40 aligns the finger 46 with its code phase. A despreader/descrambler 38 despreads and descrambles the received samples with the corresponding user code to recover the contribution of that multipath component to the user data. The path tracker 40 also tracks the path and corrects sampling errors via interpolation, for example, so that the de-spreader/descrambler 38 input always appears properly sampled. The contribution is weighted by a complex weighting device 42 to optimize the combining of multiple components. Preferably, the weighting is performed by a maximal ratio combining (MRC), although other weighting algorithms may be used. A signal to noise ratio (SNR) estimator 44 estimates the SNR of the multipath component for use in the weighting and combining algorithms. A compution mechanism for computing the weighting factor (w) is preferably local to the rake finger 46. In this embodiment, a path weight generator 43 is provided. The path weight generator typically operates on based on the data component of the despread signal. It is important to note, however, that decision feedback may be used to make the rake finger 46 operate based on the data component of the despread signal.

Referring again to FIG. 4, each finger 32 preferably operates in isolation from the other fingers and can have the assigned antenna 28, code and code phase reconfigured to any other antenna 28, code and code phase. The isolation and reconfigurability allows for versatile utilization of the Rake finger pool for varying environments. Also, the isolation and reconfigurability facilitates implementing the fingers 32 using a small scalable design, which is highly advantageous for use on an application specific integrated circuit (ASIC). For ASICs having a clock rate exceeding the chip rate, each reconfigurable Rake finger 32 can be used to process multiple components. To illustrate, for a 16 times chip rate clock, 16 multipath components can be processed by the same reconfigurable Rake finger during a chip period.

Figure 6:
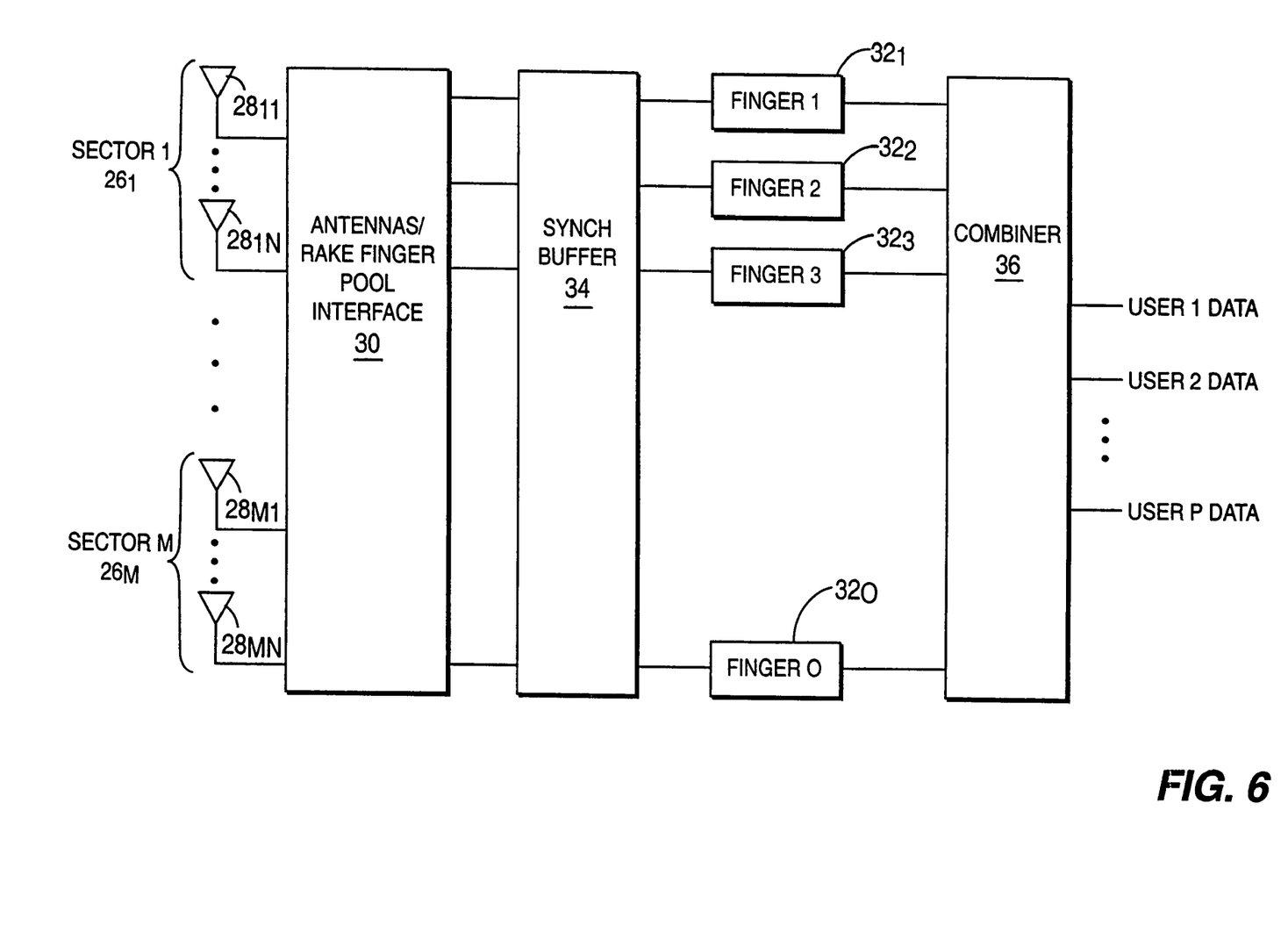
FIG. 6 is a simplified block diagram of an alternate preferred Node-B/base station receiver.

Since the output of the Rake fingers 32 have varying code phase delays, a synchronization buffer 34 is used to synchronize the Rake finger outputs prior to combining. Preferably, the synchronization buffering is performed using a common memory. In an alternate embodiment, as shown in FIG. 6, the buffering may be performed prior to input of the samples into the Rake finger pool so that the outputs of each Rake finger 32 are synchronized prior to combining.

Figure 7:
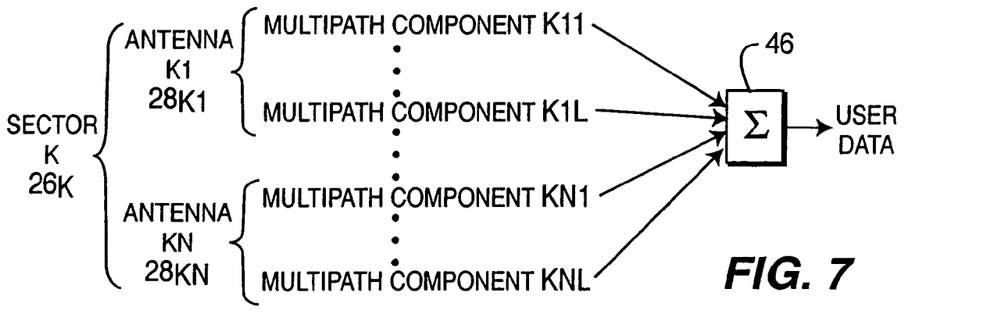
FIG. 7 is an illustration of combining multipath components of a user.

After synchronization of each Rake finger output, each UE's multipath components are combined by the combiner 36 to produce soft symbols for that user (User 1 Data to User 2 Data). FIG. 7 illustrates combining for a user residing in sector K $26_K$. For each of the N antennas $28_{K1}$ to $28_{KN}$ in sector K $26_K$, L multipath components (multipath components K11 to K1L to KN1 to KNL) are combined, although the number of multipath components combined for each antenna 28 may vary. The NxL components are combined by a combiner, such as a summer 46, to produce the user data.

Figure 8:
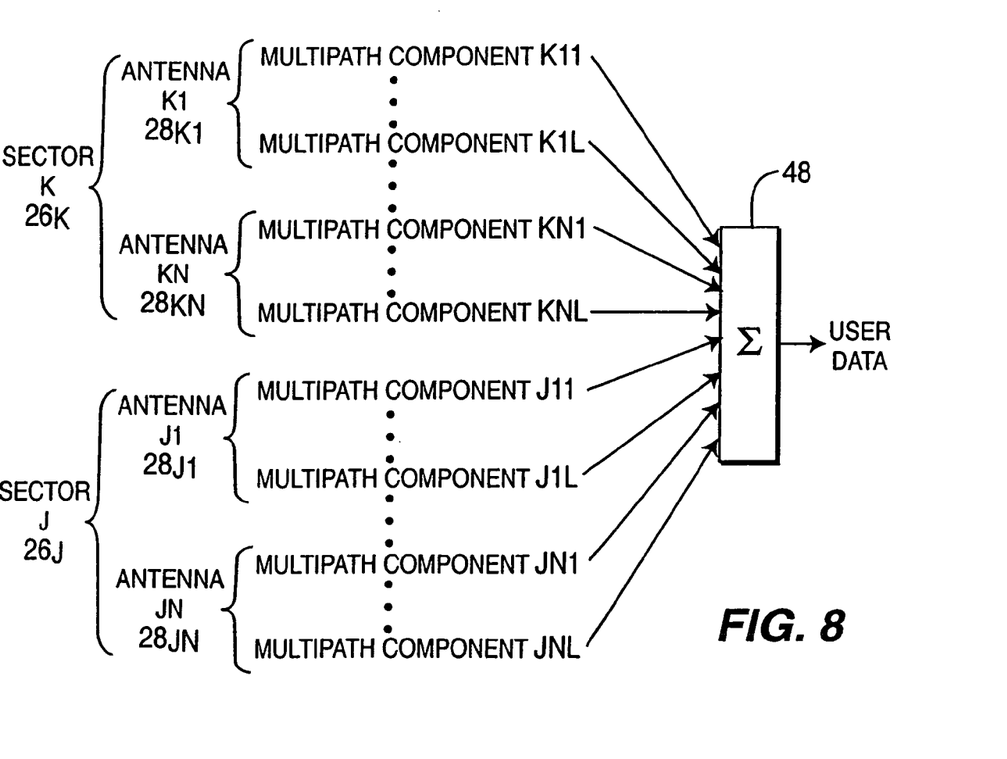
FIG. 8 is an illustration of combining multipath components of a user experiencing softer handover.

FIG. 8 illustrates combining for a user being handed off, by softer handover, between sector J $26_J$ and sector K $26_K$. In softer handover, the user is transitioning between two sectors 26. During the transition, the user communicates with both sectors 26. For each of the N antennas $28_{K1}$ to $28_{KN}$ and $28_{J1}$ to $28_{JN}$ in sector J and K, L multipath components are combined by the combiner 48 producing the user data.

The configuration of the Node-B/base station receiver allows for dynamic cell loading and user distributions. The reconfigurability of the Rake fingers 32 allows for allocation of the fingers 32 where needed. For a cell having users evenly distributed among its sectors, the Rake fingers 32 can be allocated evenly to each sector 26. For cells having sectors with higher loads than other sectors, more fingers can be allocated to the highly loaded sectors. More Rake fingers 32 can also be allocated on demand to users requiring a higher quality of service (QOS) than other users.

Figure 9A:
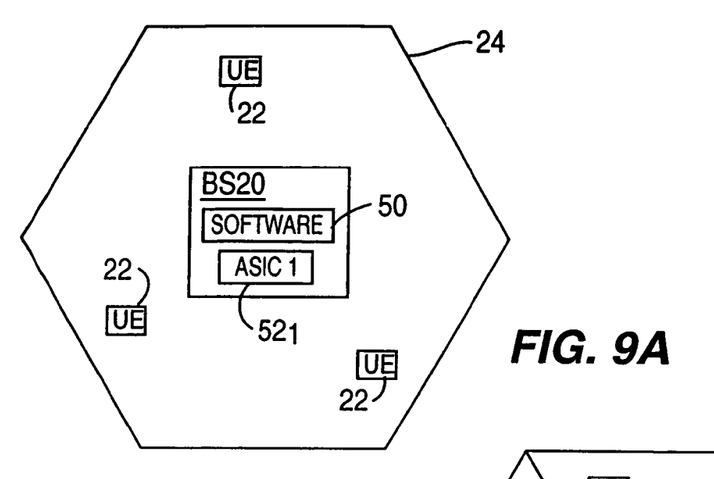
FIG. 9A, 9B and 9C are illustrations of the scalability and flexibility of the Node-B/base station receiver.
Figure 9B:
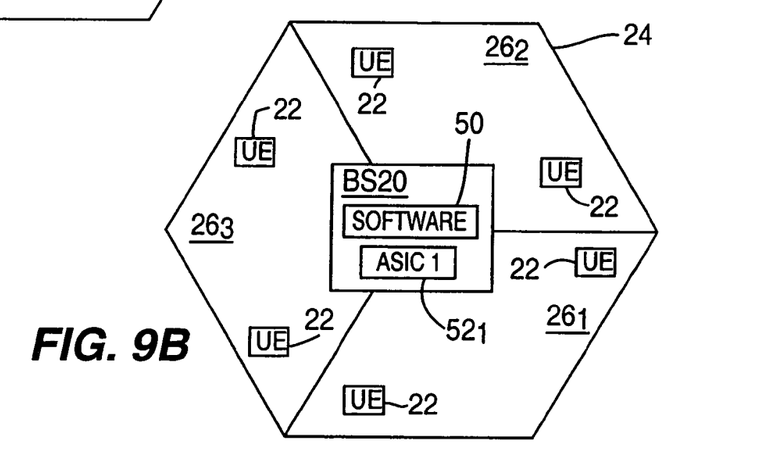
Figure 9C:
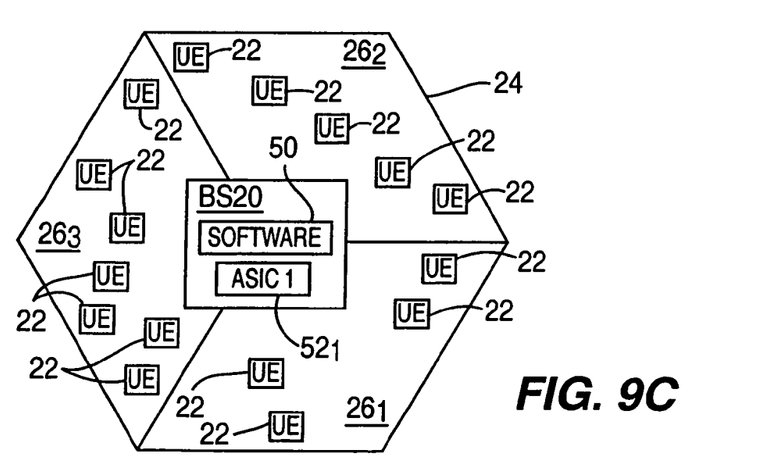

FIGS. 9A, 9B and 9C further illustrate the scalability and flexibility of the Node-B/base station receiver. As illustrated in FIG. 9A, initially an unsectored cell 24 with a light loading is entirely handled by a single ASIC $52_1$. As the cell loading increases as in FIG. 9B, the cell 24 is broker into three sectors $26_1$, $26_2$, $26_3$. The flexible reconfigurability of the Rake fingers 32 allows for the same ASIC $52_1$ to be utilized for the sectored cell. The Rake fingers 32 are allocated to users in the different sectors by modification, such as by software 50, of the antennas/Rake pool interface 30. As the cell loading increases as shown in FIG. 9C, additional ASICs $52_2$ can be added to increase the overall number of available Rake fingers 32. The addition of ASICs $52_2$ allows for scalability of the Node-B/base station receiver.

Preferably, for a receiver having multiple ASICs 52, each user is assigned to a specific ASIC 52 for processing to facility combining across sectors for softer handover. Since, preferably, none of the Rake fingers 32 are assigned to a sector 26, combining of a user's received components from multiple sectors 26 is readily achieved. This ability to combine multiple sector components facilitates softer handover as shown in FIG. 8. Alternately, an ASIC 52 could be assigned to each sector 26. However, if softer handover is used for an ASIC 52 assigned solely to a sector 26, an interface for combining the components of the UEs experiencing softer handover is utilized.

What is claimed is:

1. A Node-B/base station receiver comprising:
   at least one antenna for receiving signals from users;
   a pool of reconfigurable Rake fingers, each finger for recovering a multipath component of a user, each Rake finger assigned a code of the user, a code phase of the multipath component and an antenna of the at least one antenna;
   an antenna/Rake finger pool interface for providing each finger of the Rake pool an output of the antenna assigned to that Rake finger;
   a combiner for combining the recovered multipath components for a user to produce data of the user; and
   wherein the pool of Rake fingers is on a single application specific integrated circuit (ASIC) and as loading of a cell of the Node-B/base station receiver increases, additional ASICs are added, each additional ASIC comprising:
   a cool of Rake fingers; and
   software configured to reconfigure the single ASIC and additional ASICs as the loading of the cell increases.

2. The Node-B/base station receiver of claim 1 further comprising a buffer for use in phase aligning the recovered multipath components prior to input into the combiner.

3. The Node-B/base station receiver of claim 1 further comprising a buffer for using in phase aligning the output of the antenna/Rake finger pool interface prior to input into the pool so that the combining outputs of the fingers of the pool is performed without phase aligning.

4. The Node-B/base station receiver of claim 1 wherein the at least one antenna is a plurality of antenna.

5. The Node-B/base station receiver of claim 1 wherein the receiver is configured to service a plurality of sectors, each sector having a plurality of antennas.

6. The Node-B/base station receiver of claim 1 wherein the receiver is configured to service a plurality of sectors, while a user is transitioning between two of the plurality of sectors, and wherein the combiner is configured to combine multipath components of the user from the plurality of sectors.

7. The Node-B/base station receiver of claim 1 wherein the receiver is clocked at a rate greater than the chip rate and wherein each Rake finger is configured to process a plurality of multipath components during a chip period.

8. The Node-B/base station receiver of claim 1 wherein a number of Rake fingers allocated to each user differs.

9. The Node-B/base station receiver of claim 8 wherein a number of Rake fingers allocated to a user is based on quality of service requirements.

10. The Node-B/base station receiver of claim 1 wherein the receiver is configured to service a plurality of sectors and wherein each ASIC is assigned a sector.

11. The Node-B/base station receiver of claim 10 further comprising another combiner for combining multipath components of users from a plurality of ASICs for users experiencing softer handover.

12. The Node-B/base station receiver of claim 11 wherein when a user transitions between two of the plurality of sectors, the combiner of the user's assigned ASIC is configured to combine multipath components of the user from the plurality of sectors and the Rake finger of only the user's assigned ASIC processes that user's multipath components.

13. The Node-B/base station receiver of claim 1 wherein the receiver is configured to service a plurality of sectors and wherein each user within a cell of the Node-B/base station is assigned to a single ASIC of the ASICs.

14. A Node-B/base station comprising:
at least one antenna for receiving signals from users;
an application specific integrated circuit (ASIC) comprising:
a pool of reconfigurable Rake fingers, each finger for recovering a multipath component of a user, the Rake finger assigned a code of the user, a code phase of the multipath component and an antenna of the at least one antenna;
an antenna/Rake finger pool interface for effectively coupling each finger of the Rake pool an output of the antenna assigned to that Rake finger, the interface capable of changing the effective coupling; and
a combiner for combining the recovered multipath components for a user to produce data of the user; and
software for controlling the effective coupling of each finger to the antenna output, wherein said software is configured to reconfigure said effective coupling as additional ASICs are added at the Node-B/base station, each additional ASIC having a pool of Rake fingers.

15. A scalable Node-B/base station comprising:
at least one antenna for receiving signals from users;
at least one application specific integrated circuit having a pool of reconfigurable Rake fingers, each finger for recovering a multipath component of a user, the Rake finger assigned a code of the user, a code phase of the multipath component and an antenna of the at least one antenna;
an antenna/Rake finger pool interface for effectively coupling each finger of the Rake pool to an output of the antenna assigned to that Rake finger;
software for reconfiguring the effective coupling as additional ASICs are added at the Node-B/base station, each additional ASIC having a pool of Rake fingers; and
a combiner for combining the recovered multipath components for a user to produce data of the user.

16. The scalable Node-B/base station of claim 15 wherein the Node-B/base station is configured to handle a plurality of sectors and wherein the Rake fingers of each ASIC are capable of being assigned multipath components from any of the sectors.

17. The scalable Node-B/base station of claim 15 wherein the receiver is configured to service a plurality of sectors wherein each user within a cell of the scalable Node-B/base station is assigned to a single ASIC of the ASICs.

18. The scalable Node-B/base station of claim 17, wherein when a user is transitioning between two of the plurality of sectors, the combiner of the user's assigned ASIC is configured to combine multipath components of the user from the plurality of sectors and the Rake finger of only the user's assigned ASIC processes that user's multipath components.

19. A method for increasing capacity of a base station, the method comprising:
providing a first application specific integrated circuit (ASIC) having a pool of reconfigurable Rake fingers, each finger for recovering a multipath component of a user, the Rake finger assigned a code of the user, a code phase of the multipath component and an antenna of the at least one antenna;
as the base station loading increases, adding an additional ASIC having a pool of Rake fingers; and
reconfiguring the first ASIC by software upon addition of the additional ASIC.

20. The method of claim 19 wherein the first and additional ASIC are configured to handle a plurality of sectors and wherein the Rake fingers of each of the first and additional ASIC are capable of being assigned multipath components from any of the sectors.

21. The method of claim 19 wherein the base station is configured to service a plurality of sectors wherein each user within a cell of the base station is assigned to a single ASIC of the first and additional ASICs.

* * * * *

UNITED STATES PATENT AND TRADEMARK OFFICE
CERTIFICATE OF CORRECTION

PATENT NO. : 7,092,432 B2  Page 1 of 1
APPLICATION NO. : 10/838634
DATED : August 15, 2006
INVENTOR(S) : Kaewell, Jr. et al.

It is certified that error appears in the above-identified patent and that said Letters Patent is hereby corrected as shown below:

ON TITLE PAGE

Item (56), U.S. PATENT DOCUMENTS, page 2, left column, delete line 6, and insert therefor --6,414,984 B1 7/2002 Stähle--.

Item (56), U.S. PATENT DOCUMENTS, page 2, left column, delete line 19, and insert therefor --2002/0010002 A1 1/2002 Heinila--.

At column 2, line 5, before "2A, 2B and 2C", delete "FIG." and insert therefor --FIGS.--.

At column 2, line 17, before "9A, 9B and 9C", delete "FIG." and insert therefor --FIGS.--.

At column 3, line 60, before the word "into", delete "broker" and insert therefor --broken--.

At claim 20, column 6, line 39, after the word "additional", delete "ASIC" and insert therefor --ASICs--.

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,092,432 B2 |
| APPLICATION NO. | : 10/838634 |
| DATED | : August 15, 2006 |
| INVENTOR(S) | : Kaewell, Jr. et al. |

It is certified that error appears in the above-identified patent and that said Letters Patent is hereby corrected as shown below:

ON TITLE PAGE

Item (75), Inventors:, delete line 2, and insert therefor --(US); Timothy Berghuis, Exton, PA--.

Signed and Sealed this

Twenty-fourth Day of April, 2007

JON W. DUDAS
*Director of the United States Patent and Trademark Office*